H. PATRICK.
AUTOMOBILE TURNING SIGNAL.
APPLICATION FILED MAR. 23, 1917.

1,257,294.

Patented Feb. 19, 1918.
2 SHEETS—SHEET 1.

Inventor
Henry Patrick.
By his Attorney
Oscar Geier

H. PATRICK.
AUTOMOBILE TURNING SIGNAL.
APPLICATION FILED MAR. 23, 1917.
1,257,294.
Patented Feb. 19, 1918.
2 SHEETS—SHEET 2.
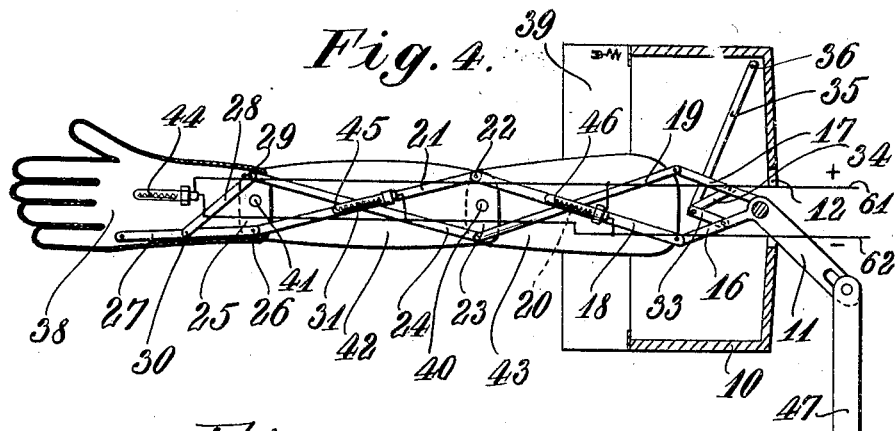
Inventor
Henry Patrick.
By his Attorney
Oscar Geier

UNITED STATES PATENT OFFICE.

HENRY PATRICK, OF NEW BRUNSWICK, NEW JERSEY.

AUTOMOBILE TURNING-SIGNAL.

1,257,294.

Specification of Letters Patent.

Patented Feb. 19, 1918.

Application filed March 23, 1917. Serial No. 156,812.

*To all whom it may concern:*

Be it known that I, HENRY PATRICK, a citizen of the United States, resident of New Brunswick, county of Middlesex, and State of New Jersey, have invented certain new and useful Improvements in Automobile Turning-Signals, of which the following is a specification.

This invention relates to improvements in apparatus for indicating the turning of vehicles, and has as its principal object the provision of means whereby the chauffeur, driver, or other party in control is enabled to indicate to parties at the rear or alongside the vehicle the intention of turning, and in which direction the vehicle is to be turned.

A further object is to provide such devices having means which audibly announce such intention, and which is further indicated by the use of colored lights in addition to the extended arm.

A still further object is to provide such means in forms which are readily operable either by hand or foot, and which are capable of being normally folded into small compass so as to occupy but a little space.

These and other like objects are attained by the novel design, construction and combination of parts hereafter described and shown in the accompanying drawings, forming a material part of this specification, and in which:—

Fig. 4 is a longitudinal sectional view of the arm extended, showing the operative parts contained therein.

Fig. 5 is a sectional view showing the same parts in a folded or collapsed position.

Fig. 6 is a similar view of the same, the side plates being omitted.

Fig. 7 is a partial elevational and diagrammatic view indicating the application of the electric current to the lights contained in the signal arm, and Fig. 8 is a similar view of the same, showing the switch lever in contact and the signal arm extended.

Figure 1:
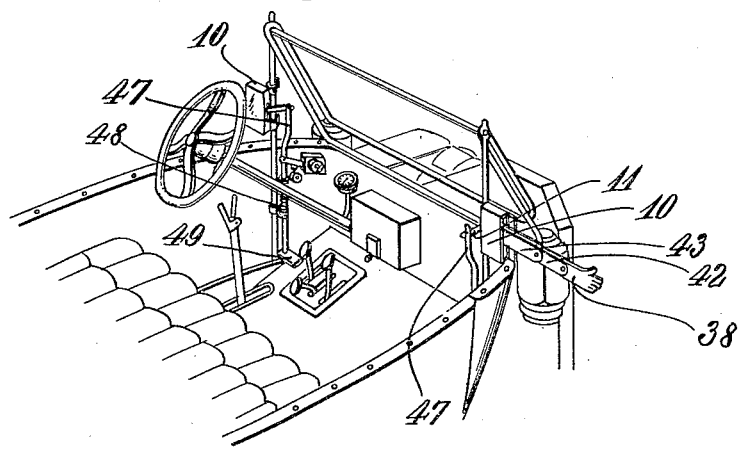
Figure 1 is a perspective view showing the application of the invention to a conventional form of automobile.
Figure 2:
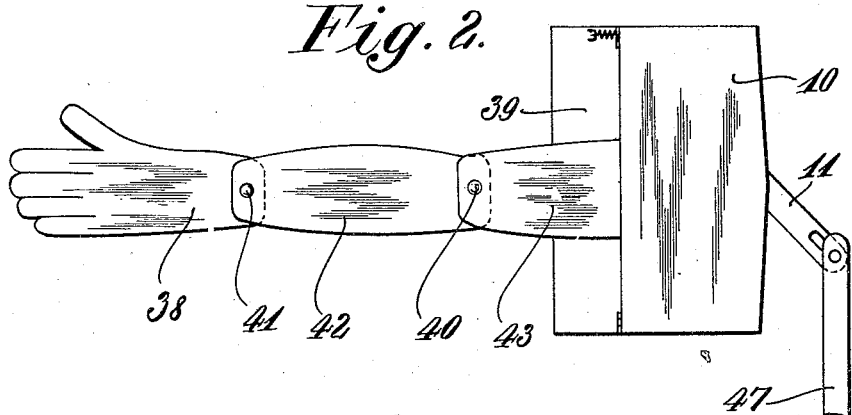
Fig. 2 is a front elevational view of the signal as extended.
Figure 3:
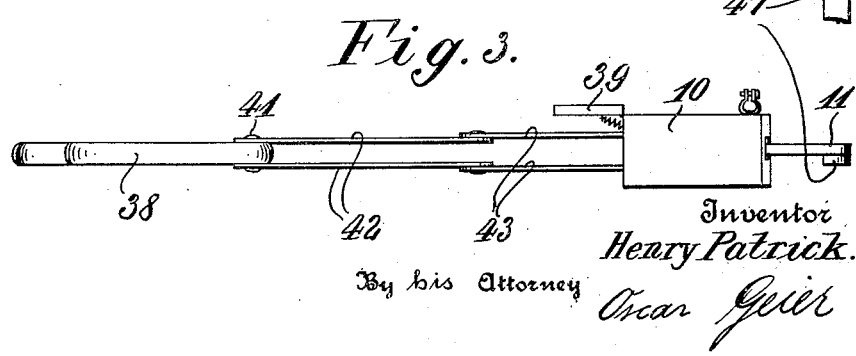
Fig. 3 is a top plan view of the same.

The apparatus consists of an essentially rectangular casing 10, relatively narrow in width, and arranged to be secured to the wind shield or dasher supports, the only normally extending parts being the operating lever.

This lever 11 extends outwardly through an opening 12, formed within the sides of the casing 10, and is pivoted upon a transverse pin 15, secured in the casing.

Rigid with the lever 11 is an arm 16, a similar arm 17 being pivoted on the pin 15, these constituting the first elements in a plurality of lazy-tong elements consisting of rods 18 and 19, pivoted together at 20, the rod 18 being pivotally engaged with another rod 21, the pivot pin 22 being fixed in a plate 23; the arm 19 is pivoted to the rod 24, opposite the pin 22, so that the jointed rods may be laterally extended; the rod 21 in turn is pivoted upon the plate 25 by the pin 26, with the lever 27, while the rod 24 is pivotally engaged with the short lever 28, by the pin 29, opposite the pin 26, and engaged by the pin 30 with the lever 27 midway in its length, the bars 21 and 24 being pivoted together at their centers 31.

Also pivotally engaged with the arm 16 is a link 33, the outer end of which is pivoted to link 34, in turn pivoted at the center of the bar 17, the outer end of the links 33 and 34 being pivoted to a lever 35, hingedly engaged by the pin 36, the arrangement being such that upon the depression of the lever 11, that the lazy-tong elements are extended horizontally and maintained in such horizontal position by the combination of links 33 and 34, and lever 35.

When the lever 11 is raised, the lazy-tong elements and their link connections are drawn within the casing, together with the hollow hand 38, the parts being enterable within the casing through the spring-closed hinged door 39.

Attached to the elements 23 and 25, by pivots 40 and 41, are plates 42 and 43, translucent in their nature so that lights such as the electric lamps 44, 45, and 46 may brightly illuminate the interior when current is applied as per wire diagram shown in Figs. 7 and 8.

Operatively engaged in the slotted end of the lever 11 is a linked rod 47, held normally upward by coiled springs 48, and depressible by contacting with the treadle 49 conveniently arranged for the operator's foot. Thus the lever may be operated by either foot or hand as may be most convenient.

In order to provide an electric circuit by means of which the signal may be illuminated, a wire 52 enters the switch terminal 53, a similar terminal 54 being upon the opposite side, contact between which is made by the button 55.

From the contact 54 to the fixed contact terminal 57 extends a wire 58, another fixed contact 60 being disposed contiguous to the contact 57, and from which leads a wire 61 directly to the lamps 44, 45, and 46, the current passing through the wires 62, back to the battery or the source of electric power.

The contacts 57 and 60 are engageable by means of the lever head 65, the opposite slotted end of which is engaged with a pin 67, fixed in the link 47, so as to make or break contact between the several lamps when the lever 11 is moved up or down.

Also secured is a bell 70, of the repeating order, which, when the button 71 is depressed, causes the same to ring continuously, until the spring has become exhausted, or the lever removed, the lever 66 being so arranged as to contact with a knob 71 when it is desired.

From the foregoing, it will be seen that a signal representative of a person's arm may be extended from either side of the vehicle at will, and that same may be illuminated so as to show the signal in the dark, and at the same time an audible signal from the bell 70 announces the intention of the operator to depart from a straight course.

It will be further apparent that the entire device is one which is relatively inconspicuous when not in use, and may be folded so as to occupy little or no space.

Having thus described my invention, what I claim as new, and desire to secure by Letters Patent, is:—

1. In a vehicle signal, the combination with a casing, and a plurality of translucent side plates engaged therewith, of lazy-tong links between said side elements, an actuating lever for said links, a translucent hand engaged at the outer end of said elements, a source of electrical energy, means for controlling said energy, a plurality of lights engaged between said plates, and means operable by said actuating lever for making a circuit between said lights and said source of electric energy.

2. In a vehicle signal, the combination with a hollow casing, and a plurality of lazy-tong elements engaged therein, of translucent plates secured to the sides of said lazy-tong elements, a translucent hand engaged at the outer end of said lazy-tongs, an operating lever for said lazy-tongs, means combined within said casing and with said operating lever whereby said lazy-tongs may be extended or retracted, a foot-pedal, connections between said foot-pedal and said operating lever, a plurality of lights carried by said lazy-tong elements, a source of electrical energy in circuit therewith and means for controlling the current from said source of electricity.

In testimony whereof I have affixed my signature.

HENRY PATRICK.

Copies of this patent may be obtained for five cents each, by addressing the "Commissioner of Patents, Washington, D. C."